US011969758B2

(12) United States Patent
Hirshberg

(10) Patent No.: US 11,969,758 B2
(45) Date of Patent: Apr. 30, 2024

(54) AUTOMATED OBJECT-SORTING APPARATUS

(71) Applicant: Jay Hirshberg, Fort Myers, FL (US)

(72) Inventor: Jay Hirshberg, Fort Myers, FL (US)

( * ) Notice: Subject to any disclaimer, the term of this patent is extended or adjusted under 35 U.S.C. 154(b) by 0 days.

(21) Appl. No.: 18/131,217

(22) Filed: Apr. 5, 2023

(65) Prior Publication Data

US 2023/0234099 A1 Jul. 27, 2023

Related U.S. Application Data

(63) Continuation of application No. 17/677,341, filed on Feb. 22, 2022, now Pat. No. 11,648,587.

(60) Provisional application No. 63/153,802, filed on Feb. 25, 2021.

(51) Int. Cl.
*B07B 1/36* (2006.01)
*F42B 35/02* (2006.01)
*B07B 1/46* (2006.01)

(52) U.S. Cl.
CPC ................ *B07B 1/36* (2013.01); *F42B 35/02* (2013.01); *B07B 1/469* (2013.01); *B07B 2201/04* (2013.01)

(58) Field of Classification Search
CPC ....... B07B 1/36; B07B 1/469; B07B 2201/04; F42B 35/02
See application file for complete search history.

(56) References Cited

U.S. PATENT DOCUMENTS 2,358,453 A * 9/1944 Gilson ............... G01N 15/0272 209/346
2,399,280 A 4/1946 McDonell
3,100,474 A * 8/1963 Schneider ............ A01K 1/0114 119/462
3,315,807 A 4/1967 Rosen
3,367,498 A 2/1968 Tonjes et al.
(Continued)

FOREIGN PATENT DOCUMENTS

CN 107824430 A 3/2018
CN 108580324 A 9/2018
(Continued)

OTHER PUBLICATIONS

International Search Report and Written Opinion, dated May 24, 2022, for related International application No. PCT/US2022/017216 (15 pages).

*Primary Examiner* — Joseph C Rodriguez
(74) *Attorney, Agent, or Firm* — Polsinelli PC

(57) ABSTRACT

An object-sorting apparatus includes a housing that extends from a top end to a bottom end, at least one vibration element, and a plurality of stages arranged in a vertical sequence in the housing between the top end and the bottom end. At least one of the stages includes a sorting base that at least partially defines a floor of the at least one stage. The sorting base is coupled to the at least one vibration element, and is configured to receive thereon a mixture of objects having different sizes, including a target size associated with the at least one stage. The stage also includes apertures defined in and extending through the sorting base and into flow communication with a next lower stage. The apertures are sized to receive therethrough, from the mixture, objects having a size smaller than the target size associated with the at least one stage.

20 Claims, 5 Drawing Sheets

(56) References Cited

U.S. PATENT DOCUMENTS

| | | | | |
|---|---|---|---|---|
| 4,494,804 | A * | 1/1985 | O'Keeffe | B25H 3/02 312/211 |
| 4,848,607 | A * | 7/1989 | Halley | B07B 1/46 209/365.2 |
| 5,222,605 | A * | 6/1993 | Pogue | B07B 13/16 209/390 |
| 5,495,950 | A * | 3/1996 | Jellum | B07C 7/04 209/703 |
| 5,541,831 | A | 7/1996 | Thomas | |
| 7,403,872 | B1 | 7/2008 | St. Onge et al. | |
| 7,987,990 | B2 | 8/2011 | Srivatsan | |
| 8,297,446 | B2 | 10/2012 | Spence, Jr. | |
| 8,991,618 | B2 | 3/2015 | Green | |
| 11,701,690 | B2 * | 7/2023 | Janes | B07B 1/28 209/355 |
| 2006/0243643 | A1 | 11/2006 | Scott et al. | |
| 2014/0260925 | A1 | 9/2014 | Beach et al. | |
| 2015/0283581 | A1 | 10/2015 | Jones et al. | |
| 2016/0001911 | A1 * | 1/2016 | Brigham | B07C 7/02 53/390 |
| 2016/0101440 | A1 | 4/2016 | Grygierczyk et al. | |

FOREIGN PATENT DOCUMENTS

| | | | |
|---|---|---|---|
| CN | 109317402 | B | 12/2020 |
| WO | 2014/066893 | A1 | 5/2014 |

* cited by examiner

AUTOMATED OBJECT-SORTING APPARATUS

CROSS-REFERENCE TO RELATED APPLICATION

This application is a continuation of, and claims priority to, U.S. patent application Ser. No. 17/677,341, filed Feb. 22, 2022, entitled "AUTOMATED OBJECT-SORTING APPARATUS," which claims the benefit of and priority to U.S. Patent Provisional Application Ser. No. 63/153,802, filed Feb. 25, 2021, entitled "AUTOMATED OBJECT-SORTING APPARATUS," the entire contents of all of which are hereby incorporated in their entirety.

FIELD

The field of the disclosure relates generally to sorting objects and, more particularly, to an apparatus for automatically sorting a mixture of objects into batches, with each batch corresponding to a standard size of the object.

BACKGROUND

There are applications in which it is necessary to sort a mixture of differently sized objects into batches, with each batch containing objects of a standard size. One such application arises in the context of reloading of spent ammunition casings. The spent casings are typically obtained (e.g., collected from the floor of a shooting range) in lots that include a plurality of different sizes (i.e., different calibers) mixed together. An ammunition cartridge reloader must separate the mixture of spent casings into caliber-specific batches, in order to efficiently reload the spent casings to produce live cartridges for each caliber. However, manual sorting of the many different calibers of spent cases is labor- and time-intensive.

One known method of sorting a mixture of sizes of spent casings is to use pans with a grating on the bottom. A width of the grating apertures for each pan is sized to pass any object smaller than a corresponding caliber of casing, thus retaining a given caliber of casing in each pan. However, the pans must be manually shaken until the smaller objects align with and fall through a grating aperture, which requires significant time and manual effort. In addition, adding more than a few spent casings to the pan typically causes the apertures to become blocked or clogged, necessitating frequent pauses to empty the pan and add a few more spent casing from the mixture. Moreover, to empty a pan after sorting, the pan must be manually positioned over a receptacle and inverted, which can result in a spill as the weight of the retained casings shifts in the pan and causes the user to lose alignment with the receptacle.

Some known systems attempt to mechanize the sorting of spent casings. For example, the spent casings are fed single-file along a track and, as the width of a slot in the bottom of the track increases along the track length, spent casings of a correspondingly larger caliber drop through the slot at corresponding locations. However, such track-based systems require an exceedingly large footprint to accommodate not only the necessary plurality of slot-width sections along the track, but also the feeding apparatus that must be used to supply spent casings one-at-a-time to each track. Moreover, the single-file sorting process requires significant amount of time to process a large number of spent casings.

Accordingly, an apparatus that automatically sorts a mixture of differently sized objects into batches of uniform standard-sized objects, without requiring the significant manual effort, time delays, and/or large footprint of known systems, would find utility.

SUMMARY

In one aspect, an object-sorting apparatus is provided. The object-sorting apparatus includes a housing that extends from a top end to a bottom end, at least one vibration element, and a plurality of stages arranged in a vertical sequence in the housing between the top end and the bottom end. At least one of the stages includes a sorting base that at least partially defines a floor of the at least one stage. The sorting base is coupled to the at least one vibration element, and the sorting base is configured to receive thereon a mixture of objects having different sizes. The different sizes include a target size associated with the at least one stage. The at least one stage also includes a plurality of apertures defined in and extending through the sorting base and into flow communication with a next lower one of the plurality of stages. The apertures of the at least one stage are sized to receive therethrough, from the mixture, objects having a size smaller than the target size associated with the at least one stage.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The examples described herein include an object-sorting apparatus configured to sort a mixture of objects having different sizes. The examples include a plurality of stages arranged in a vertical sequence between a top end and a bottom end of a housing. At least one of the stages includes a sorting base that at least partially defines a floor of the at least one stage. Apertures are defined in and extend through the sorting base and into flow communication with a next lower stage. The apertures are sized to receive therethrough, from the mixture, objects having a size smaller than a target size associated with the at least one stage. The at least one stage is coupled to a vibration element that improves a sorting efficiency of the sorting base.

In certain examples, the at least one stage includes a receptacle configured for selective movement between a collecting position inside the housing and an opened position at least partially outside the housing. Moreover, in some such embodiments, the receptacle is further configured for selective movement between the opened position and an emptying position, in which gravity causes any objects collected in the receptacle to fall out of the receptacle. In some such embodiments, the at least one stage includes a drawer slide mechanism, configured to guide movement of the receptacle between the collecting position and the opened position, and/or a pivot mechanism, configured to guide movement of the receptacle between the opened position and the emptying position.

Moreover, in some examples, the object-sorting apparatus includes a control interface operable to adjust, for example, a magnitude, a frequency, and/or a duration of vibration of the vibration element. The control interface may include physical controls accessible on the housing and/or may be in wireless communication with an application executing on an external computing device. in some such examples, the control interface is programmable to apply a plurality of different vibration profiles to the sorting base in a sequence, improving a sorting efficiency of the sorting base relative to conventional apparatus and methods for sorting objects.

Figure 2:
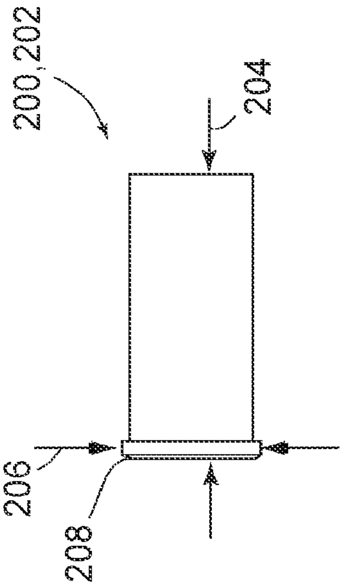
FIG. 2 is an elevation view of an example first object that may be among a mixture of objects for sorting by the object-sorting apparatus of FIG. 1.
Figure 1:
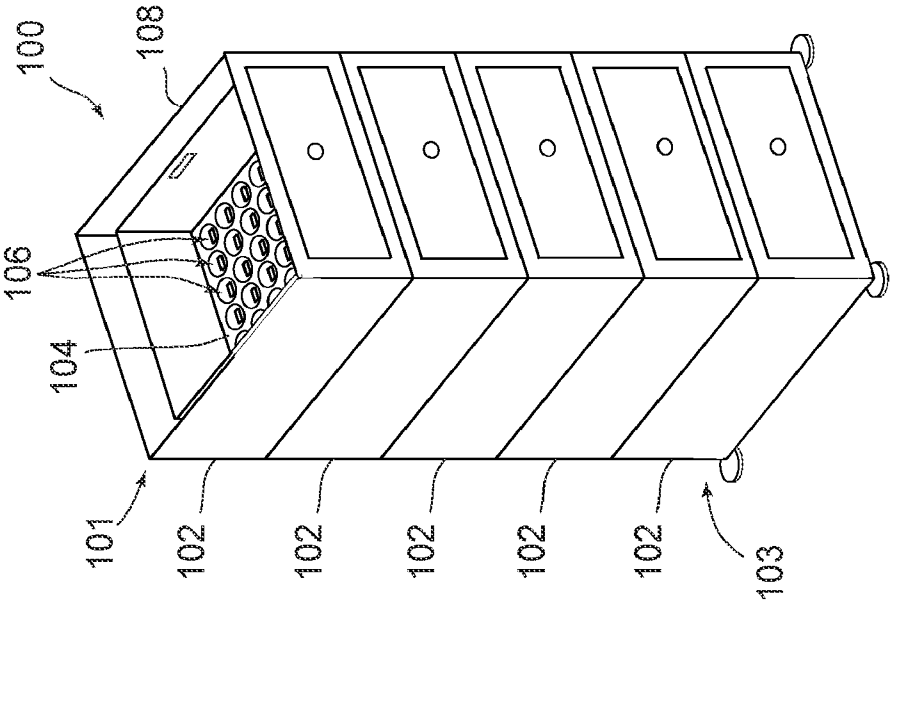
FIG. 1 is a perspective view of an example embodiment of an object-sorting apparatus.

FIG. 1 is a perspective view of an example embodiment of an object-sorting apparatus 100. FIG. 2 is an elevation view of an example first object 202 that may be among a mixture of objects 200 for sorting by object-sorting apparatus 100, and FIG. 3 is an elevation view of an example second object 302 that may be among the mixture of objects 200 for sorting by object-sorting apparatus 100

Object-sorting apparatus 100 includes a housing 108 that extends from a top end 101 to a bottom end 103, and a plurality of stages 102 arranged in housing 108 in a vertical sequence between top end 101 and bottom end 103. Object-sorting apparatus 100 is configured to automatically sort the mixture of objects 200 of different standard sizes into batches of same-sized objects 200. More specifically, at least one stage 102 is configured to capture a batch of objects 200 having a predetermined, standard target size from the mixture and pass smaller-sized objects 200 through to the next lower stage 102.

In the example embodiment, each stage 102 includes a sorting base 104 that at least partially defines a floor of the stage 102. A plurality of apertures 106 are defined in sorting base 104. More specifically, apertures 106 extend through sorting base 104 and into flow communication with the next lower stage 102, which is located directly underneath sorting base 104. Apertures 106 of each stage 102 are sized to receive therethrough objects 200 having a size smaller than the target size for the stage, thus causing sorting base 104 to retain thereon objects 200 having a size equal to (or larger than) the target size.

Figure 3:
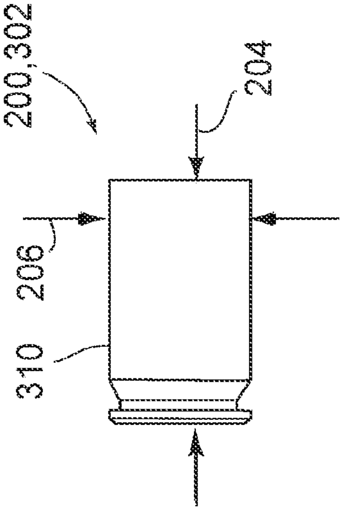
FIG. 3 is an elevation view of an example second object that may be among a mixture of objects for sorting by the object-sorting apparatus of FIG. 1.

As shown in FIGS. 2 and 3, in some embodiments, objects 200 are generally elongated in shape and have a major (i.e., longest) dimension 204 and a minor (i.e., shortest) dimension 206. In order for each stage 102 to retain only objects 200 having a target size (or larger), apertures 106 for the stage 102 must correspondingly have a minor dimension 116 (shown in FIGS. 5 and 7) sized to pass through objects 200 having minor dimension 206 less than the minor dimension 206 of the target object 200, but to stop or block objects 200 having minor dimension 206 equal to (or greater than) the minor dimension 206 of the target object 200.

For example, objects 202 are rimmed spent casings, and minor dimension 206 is defined by a diameter of a rim 208 of the spent casing. In some embodiments, objects 202 may include spent casings from .38 special ammunition rounds, typically having minor dimension 206 of 0.440 inches.

For another example, objects 302 are straight-walled or rimless spent casings, and minor dimension 206 is defined by a diameter of a body 310 of the spent casing. In some embodiments, objects 302 may include spent casings from 9 millimeter ammunition rounds, typically having minor dimension 206 of 0.392 inches, from .40 caliber ammunition rounds, typically having minor dimension 206 of 0.424 inches, and/or from .45 caliber ACP ammunition rounds, typically having minor dimension 206 of 0.480 inches.

Alternatively, objects 200 include any suitable type and/or size of objects that are sortable based on a minor dimension 206.

Object-sorting apparatus 100 is configured to receive the mixture of objects 200 at a first or top stage 102 adjacent to top end 101. For example, the mixture of objects 200 is manually poured or otherwise conveyed onto sorting base 104 of top stage 102. The stages 102 are arranged vertically from top stage 102 to a last or bottom stage 102, adjacent to bottom end 103, in order of decreasing size of apertures 106. For example, in the illustrated embodiment, object-sorting apparatus 100 includes five stages 102, corresponding to an expected composition of four standard sizes of objects 200 within the mixture of objects 200. The top or first stage 102 is selected to have apertures 106 slightly smaller than a largest of the four standard sizes, the next lower or second stage is selected to have apertures 106 slightly smaller than a second largest of the four standard sizes, the next lower or third stage is selected to have apertures 106 slightly smaller than a third largest of the four standard sizes, and the penultimate or fourth stage is selected to have apertures 106 slightly smaller than a smallest of the four standard sizes.

In one non-limiting example, the mixture of objects 200 includes spent casings from 9 millimeter ammunition rounds, .40 caliber ammunition rounds, .38 special ammunition rounds, and .45 caliber ACP ammunition rounds. Accordingly, apertures 106 for the first stage 102 have minor dimension 116 of 0.445 inches to pass through all objects except the spent .45 caliber ACP casings, apertures 106 for the second stage 102 have minor dimension 116 of 0.430 inches to pass through all remaining objects except the spent .38 special casings, apertures 106 for the third stage 102 have minor dimension 116 of 0.410 inches to pass through all remaining objects except the spent .40 caliber casings, and apertures 106 for the fourth stage 102 have minor dimension 116 of 0.380 inches to pass through all remaining objects (e.g., spent .22 caliber casings, detritus) except the spent 9 millimeter casings.

Alternatively, object-sorting apparatus 100 includes any suitable number of stages 102 corresponding to any expected composition of standard sizes of objects 200.

The vertical arrangement of stages 102 in order of decreasing size of apertures 106 enables object-sorting apparatus 100 to receive and efficiently sort a mixture of several sizes of objects 200 into single-size batches with a greatly reduced footprint, as compared to at least some known automated object-sorting apparatuses.

In some embodiments, the bottom (in the illustrated example, fifth) stage 102 has an aperture size of zero, and is configured to retain all remaining, smaller objects (e.g., spent .22 caliber casings which typically are not saved for reloading, or other detritus) for later removal and disposal. In other words, the bottom stage may be viewed as a waste receptacle, and may have a substantially closed floor (not shown). Alternatively, the bottom stage 102 may have any suitable configuration that enables object-sorting apparatus 100 to function as described herein. For example, bottom stage 102 may include apertures 106 sized to retain a smallest target size of objects 200 and pass smaller detritus to a cabinet floor (not shown) of object-sorting apparatus 100.

Figure 4:
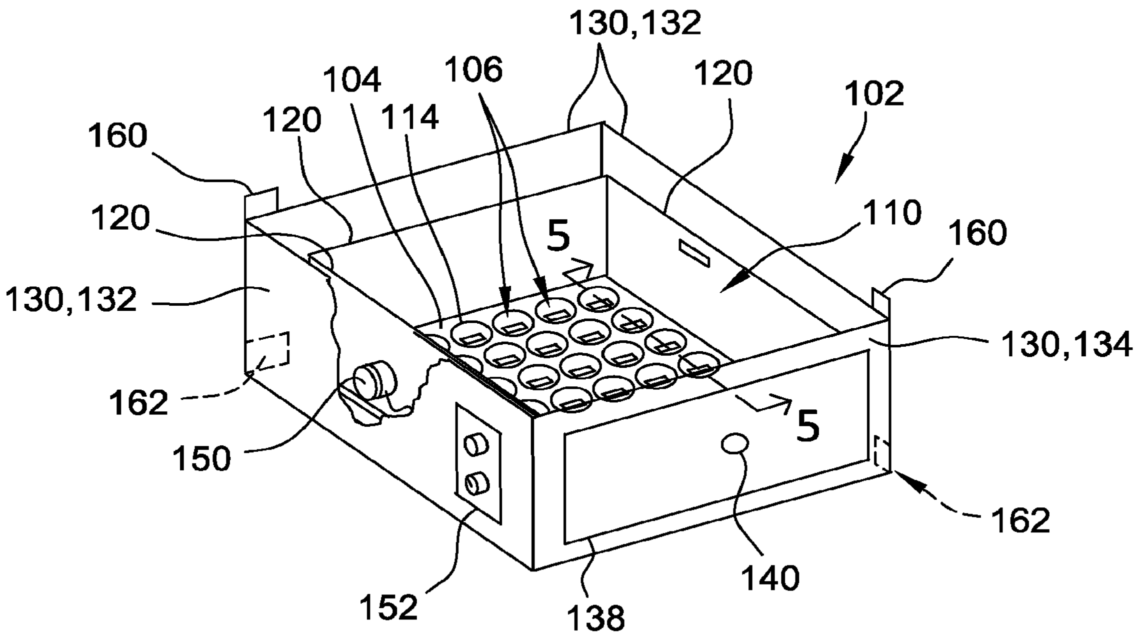
FIG. 4 is a perspective, partial cutaway view of an example embodiment of a stage for use with the apparatus of FIG. 1, including an example embodiment of a sorting base.

FIG. 4 is a perspective view of an example embodiment of stage 102, including an example embodiment of sorting base 104 and illustrating one housing wall 130 in partial cutaway view. In the example embodiment, each stage 102 includes retention walls 120. Retention walls 120 extend upward from edges of sorting base 104 and cooperate with sorting base 104 to define a receptacle 110 for objects 200 that are too large to pass through apertures 106 of sorting base 104. In the example embodiment, sorting base 104 has a rectangular perimeter and retention walls 120 are four in number, each extending orthogonally upward from a corresponding edge of the rectangle. Alternatively, sorting base 104 has any suitable shape and/or retention walls 120 have any suitable number and/or orientation that enables object-sorting apparatus 100 to function as described herein. For example, sorting base 104 has a circular shape (not shown) and retention walls 120 extend orthogonally upward from a perimeter of the circular shape to define a generally circular cross-sectional profile.

Figure 5:
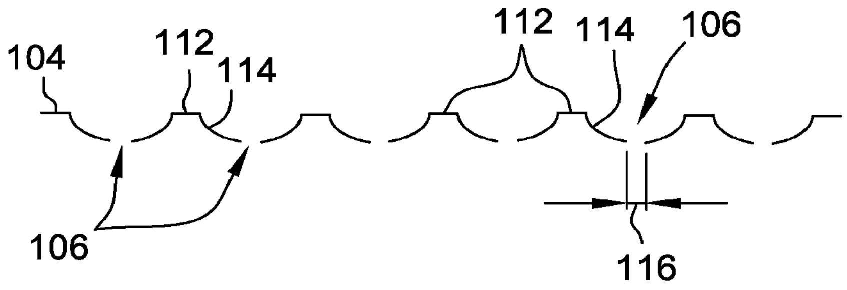
FIG. 5 is a sectional view of the sorting base of FIG. 4, taken along lines 5-5 shown in FIG. 4.

FIG. 5 is a sectional view of the sorting base 104 shown in FIG. 4, taken along lines 5-5 shown in FIG. 4. With reference to FIGS. 4 and 5, in some embodiments, sorting base 104 includes a deck 112 and depressions 114 depending therefrom. In the example embodiment, deck 112 is generally planar. Alternatively, deck 112 has any suitable configuration that enables sorting base 104 to function as described herein. Each depression 114 includes a corresponding aperture 106 defined in and extending through a bottom thereof. As discussed above, each aperture 106 includes a minor (i.e., shortest) dimension 116 sized to receive therethrough objects 200 having minor dimension 206 less than the minor dimension 206 of the target object 200 for stage 102, but to stop or block objects 200 having minor dimension 206 equal to (or greater than) the minor dimension 206 of the target object 200. In the example embodiment, apertures 106 are elongated and have a major dimension (not numbered) slightly smaller than major dimension 204 of the target size of object 200 for the stage 102, to accommodate capture and positioning of objects 200 within the surrounding depression 114. Alternatively, apertures 106 have any suitable shape and/or major dimension that enables sorting base 104 to function as described herein.

In certain embodiments, depressions 114 facilitate guiding objects 200 towards, and/or aligning objects 200 with, apertures 106, thereby improving a sorting efficiency of sorting base 104 relative to conventional object-sorting methods. In the example embodiment, each depression 114 is cup-shaped. Moreover, in certain embodiments, a size of depressions 114 varies with each stage 102, and the size may selected to facilitate capture, and feeding towards apertures 106, of objects 200 having a size smaller than the target size for the associated stage 102. Alternatively, depressions 114 have any suitable size and shape that enables sorting base 104 to function as described herein.

Figure 6:
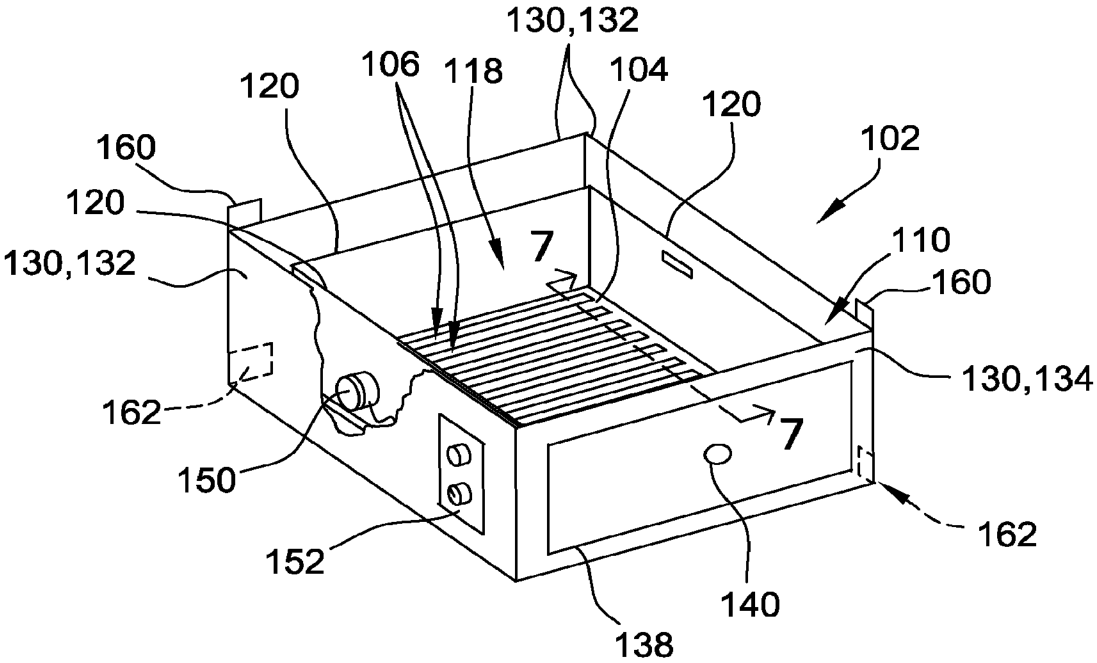
FIG. 6 is a perspective, partial cutaway view of the stage of FIG. 4, including another example embodiment of a sorting base.
Figure 7:
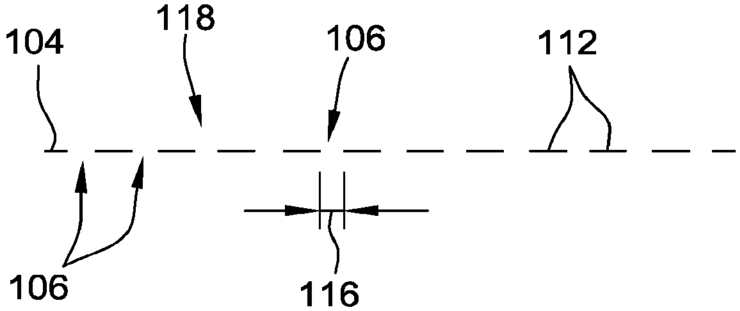
FIG. 7 is a sectional view of the sorting base of FIG. 6, taken along lines 7-7 shown in FIG. 6.

In other embodiments, sorting base 104 does not include depressions 114. For example, FIG. 6 is a perspective view of stage 102, including another example embodiment of sorting base 104 and illustrating one housing wall 130 in partial cutaway view. FIG. 7 is a sectional view of the sorting base 104 shown in FIG. 6, taken along lines 7-7 shown in FIG. 6. With reference to FIGS. 6 and 7, in some embodiments, sorting base 104 includes deck 112 being generally planar, and apertures 106 are defined in and extend through deck 112. Again, each aperture 106 includes minor (i.e., shortest) dimension 116 sized to receive therethrough objects 200 having minor dimension 206 less than the minor dimension 206 of the target object 200 for stage 102, but to stop or block objects 200 having minor dimension 206 equal to (or greater than) the minor dimension 206 of the target object 200. In the example embodiment, apertures 106 are arranged in an elongated grating 118 and have a major dimension (not numbered) much larger than minor dimension 116. Alternatively, apertures 106 have any suitable shape and/or major dimension that enables sorting base 104 to function as described herein. In certain embodiments, improvements to sorting efficiency, reduction of footprint of the apparatus, and reduction of manual effort, relative to conventional object-sorting methods, are realized by embodiments described herein even in the absence of depressions 114.

Although sorting base 104 with and without depressions 114 are illustrated separately, in some embodiments, at least one stage 102 of object-sorting apparatus 100 includes sorting base 104 with depressions 114, while another stage 102 of object-sorting apparatus 100 includes sorting base 104 without depressions 114.

In the example embodiment, each stage 102 further includes housing walls 130 positioned adjacent to retention walls 120. Housing walls 130 are configured to cooperate with housing walls 130 of other stages 102 to form housing 108 (shown in FIG. 1) of object-sorting apparatus 100. In some embodiments, housing walls 130 are spaced apart from retention walls 120 sufficiently to accommodate hardware therebetween for mounting sorting base 104 and/or retention walls 120 to housing walls 130, and/or for vibrating sorting base 104 relative to housing walls 130, as will be described below. Alternatively, housing walls 130 have any suitable spacing with respect to retention walls 120 that enables object-sorting apparatus 100 to function as described herein.

Figure 8:
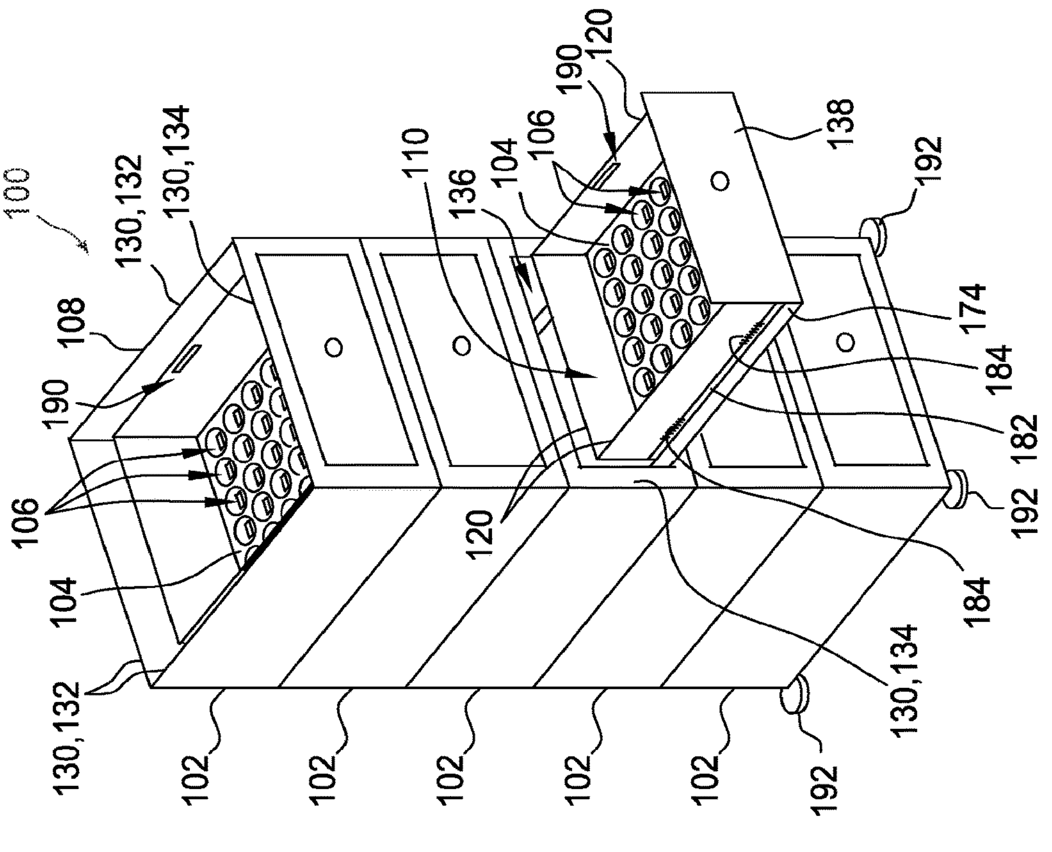
FIG. 8 is a perspective view of the object-sorting apparatus of FIG. 1, illustrating an example embodiment of a stage in an opened orientation.

In some embodiments, sorting base 104 and retention walls 120, and receptacle 110 defined thereby, are configured for selective movement between a collecting position inside housing 108 (as shown in FIG. 1) and an opened position at least partially outside housing 108 (as shown for a middle stage 102 in FIG. 8). In some such embodiments, when receptacle 110 is in the opened position, all of retention walls 120 are positioned outside housing 108. Alternatively, fewer than all retention walls 120 are positioned outside housing 108 when receptacle 110 is in the opened position.

Housing walls 130 define an opening 136 (shown in FIG. 8) configured to accommodate translation of receptacle 110 therethrough between the collecting position and the opened position. In some embodiments, housing walls 130 include a first set of housing walls 132, each oriented in a face-to-face relationship with a corresponding one of retention walls 120 when receptacle 110 is in the collecting position, and a pass-through housing wall 134 that defines opening 136. For example, in the illustrated embodiment, housing walls include a first set of three housing walls 132 around three sides of a rectangular-shaped sorting base 104, and pass-through housing wall 134 on a fourth side. Alternatively, housing walls 130 have any suitable configuration that enables object-sorting apparatus 100 to function as described herein.

In some embodiments, stage 102 further includes a drawer face 138 configured to move with receptacle 110 between the collecting position and the opened position. In some such embodiments, drawer face 138 is configured to at least partially close opening 136 when receptacle 110 is in the collecting position, for example to prevent objects 200 from escaping from receptacle 110 during sorting. Additionally or alternatively, drawer face 138 is configured to provide a grip for manual pulling of receptacle 110 from the collecting position to the opened position. For example, drawer face 138 may include a knob 140 affixed thereto for pulling receptacle 110 out from housing 108. Alternatively, drawer face 138 has any suitable configuration that enables object-sorting apparatus 100 to function as described herein.

In other embodiments, stage 102 does not include drawer face 138. For example, one of retention walls 120 is sized and oriented to close opening 136 when receptacle 110 is in the collecting position.

Object-sorting apparatus 100 further includes at least one vibration element 150 coupled, either directly or indirectly, to sorting base 104. The at least one vibration element 150 is selectively operable to drive vibration of sorting base 104 to resettle and/or rearrange objects 200 on sorting base 104. In some operational circumstances, the driven resettlement and/or rearrangement of objects 200 causes more frequent re-alignment of objects 200 with respect to apertures 106 and, consequently, more frequent transition of objects 200 having a size smaller than the target size for the stage through apertures 106 to the next lower stage 102, as compared to a manually shaken or non-vibrated sorting pan. Accordingly, vibration element 150 improves a sorting efficiency of stage 102. Moreover, in the example embodiment, vibration element 150 requires no manual effort to perform sorting, apart from an initial activation of a control.

In some embodiments, vibration element 150 is controllable to apply a plurality of different vibration profiles to sorting base 104 in a sequence. A "vibration profile" includes at least one of a vibration magnitude and a vibration frequency. In some operational circumstances, application of a plurality of different vibration profiles in sequence improves a sorting efficiency of object-sorting apparatus 100 relative to conventional object-sorting methods. For example, a first vibration profile having a relatively lower magnitude is tuned to facilitate quicker movement through apertures 106 of objects 200 that are smaller than the target size and already captured in depressions 114 or grating 118. A second vibration profile having a relatively higher magnitude is tuned to facilitate displacement of objects 200 that are of (or larger than) the target size from depressions 114 or grating 118, thereby "unblocking" the associated apertures 106 and enabling smaller objects 200 to migrate into the previously blocked depressions 114 or grating 118. After the second vibration profile is applied for a short time period, the first vibration profile is applied again to facilitate movement of the newly captured smaller objects through apertures 106, and the cycle is repeated. Alternatively, vibration element 150 applies any suitable sequence of one or more vibration profiles that enables object-sorting apparatus 100 to function as described herein.

In some embodiments, object-sorting apparatus 100 includes a control interface 152 configured to selectively activate vibration element 150. In some such embodiments, control interface 152 is further operable to adjust a magnitude, frequency, and/or duration of vibration of vibration element 150, and/or to report a status and/or operating parameters of vibration element 150. In the example embodiment, control interface 152 includes manually operable physical controls accessible on housing 108, such as switches and/or dials, to input settings for parameters such as those discussed above. Additionally or alternatively, control interface 152 is configured to wirelessly receive, for example from an application executing on a smart phone or other external computing device (not shown), instructions and parameters for operating vibration element 150.

In some embodiments, control interface 152 is programmable to apply a plurality of different vibration profiles to sorting base 104 in a sequence. A "vibration profile" includes at least one of a vibration magnitude and a vibration frequency. For example, one or more vibration profiles may be pre-programmed and/or defined via input through control interface 152, and may be stored by a memory device on-board control interface 152 or on a remote computing device (not shown) in communication with control interface 152. In some operational circumstances, application of a plurality of different vibration profiles in sequence improves a sorting efficiency of object-sorting apparatus 100 relative to conventional object-sorting methods. For example, a first vibration profile having a relatively lower magnitude is tuned to facilitate quicker movement through apertures 106 of objects 200 that are smaller than the target size and already captured in depressions 114 or grating 118. A second vibration profile having a relatively higher magnitude is tuned to facilitate displacement of objects 200 that are of (or larger than) the target size from depressions 114 or grating 118, thereby "unblocking" the associated apertures 106 and enabling smaller objects 200 to migrate into the previously blocked depressions 114 or grating 118. After the second vibration profile is applied for a short time period, the first vibration profile is applied again to facilitate movement of the newly captured smaller objects through apertures 106, and the cycle is repeated. Alternatively, vibration element 150 is configured to apply any suitable one or more vibration profiles that enables object-sorting apparatus 100 to function as described herein.

In certain embodiments, multiple stages 102 each include a respective vibration element 150. In some circumstances, each stage 102 having a respective vibration element 150 improves sorting efficiency as compared to the use of a single vibration source (or manual shaking) across multiple stages 102, which single source may result in an attenuation of the vibratory effect on some stages 102. Additionally or alternatively, in some circumstances, an optimal (with respect to sorting efficiency) vibratory magnitude and/or frequency of sorting base 104, or optimal profile of magnitudes and/or frequencies, varies in response to a composition of the initial mixture of objects 200 and/or the target size of objects 200 for the associated stage 102. In some embodiments, the respective vibration element 150 for each of the multiple stages 102 is independently tuned, for example to have a vibration magnitude, frequency, or duration different from the vibration element 150 of another stage 102, in response to the mixture composition and/or the target size of the associated stage 102, facilitating an improved sorting efficiency of the sorting base 104 for the corresponding stage 102. In some such embodiments, damping materials and/or damping devices (not shown) are installed between stages 102 to facilitate isolating each stage 102 from the effects of the vibration elements 150 of other stages 102. Alternatively, object-sorting apparatus 100 includes more or fewer vibration elements 150, such as a single vibration element 150 for all stages within housing 108.

In the example embodiment, vibration element 150 for each stage 102 is positioned between one of retention walls 120 and the adjacent one of housing walls 130, in vibratory contact with the retention wall 120. In turn, the retention wall 120 is mounted on sorting base 104 and configured to impart the vibratory motion to sorting base 104 and to objects 200 residing in receptacle 110. Alternatively, vibration element 150 is positioned in any suitable location on object-sorting apparatus 100 that enables object-sorting apparatus 100 to function as described herein.

In some embodiments, stages 102 are configured for modular stacking to enable a rapid, in-the-field arrangement of object-sorting apparatus 100 as needed to include any desired number of stages 102 and corresponding target sizes for objects 200. For example, in the illustrated embodiment, housing walls 130 include tabs 160 along an upper edge and configured to register with slots 162 defined along a lower edge of housing walls 130 of the stage 102 above, and tabs 160 and slots 162 cooperate to couple adjacent stages 102 together. It should be appreciated that the location of tabs 160 along the upper edge and slots 162 along the lower edge may be reversed. Alternatively, stages 102 are configured in any suitable fashion for modular stacking and arrangement. In other embodiments, stages 102 are not configured for modular stacking. For example, housing 108 is an equipment rack, housing walls 130 include integrally formed panels that each extend vertically across multiple stages 102, and sorting base 104 and retention walls 120 of each stage 102 are installed in a corresponding slot of the equipment rack.

Figure 9:
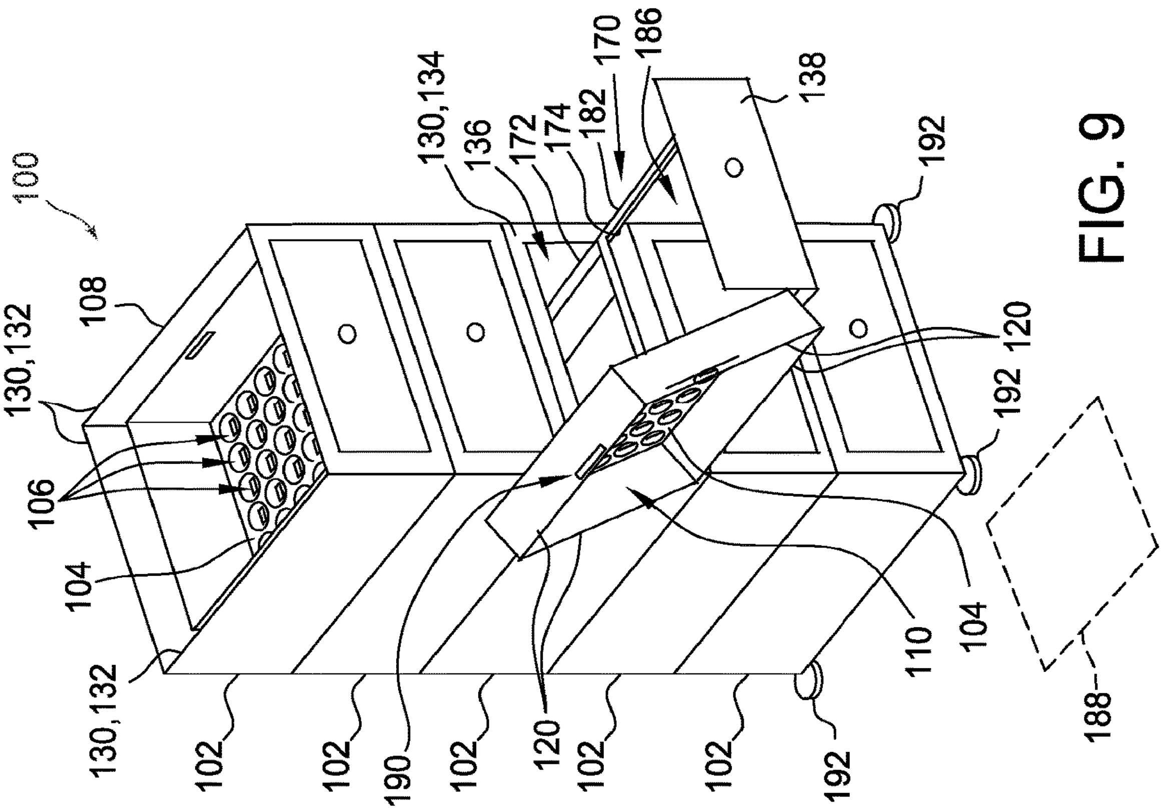
FIG. 9 is a perspective view of the object-sorting apparatus of FIG. 8, illustrating an example embodiment of a stage in an emptying orientation.

FIG. 8 is a perspective view of object-sorting apparatus 100, illustrating stage 102 in an opened orientation, that is, having receptacle 110 in the opened position. FIG. 9 is another perspective view of object-sorting apparatus 100, illustrating stage 102 in an emptying orientation, that is, with receptacle 110 in an emptying position. In some embodiments, removal of collected objects 200 from one of stages 102 is accomplished by first moving receptacle 110 from the collecting position to the opened position as shown in FIG. 8, and then by moving receptacle 110 from the opened position to the emptying position as shown in FIG. 9.

In certain embodiments, object-sorting apparatus 100 includes extended feet 192 positioned at bottom end 103. Extended feet 192 are configured to provide additional stability for object-sorting apparatus 100 against tipping, particularly as stages 102 are moved to the opened orientation and/or the emptying orientation. For example, in the illustrated embodiment, extended feet 192 are four in number and positioned at respective bottom corners of object-sorting apparatus 100. In some embodiments, extended feet 192 are selectively extendable and retractable. Alternatively, extended feet 192 have any suitable number and/or configuration, or object-sorting apparatus 100 does not include extended feet 192.

In some embodiments, stage 102 includes a drawer slide mechanism 170 configured to guide movement of receptacle 110 between the collecting position and the opened position. For example, drawer slide mechanism 170 includes outer members 172 affixed to interior surfaces of opposing housing walls 130, and inner members 174 affixed to opposing retention walls 120. Outer members 172 and inner members 174 slidably cooperate to enable translation of receptacle 110 back and forth between the collecting position and the opened position. Drawer slide mechanism 170 is further configured to accommodate vibratory motion transmitted from Alternatively, stage 102 is configured to enable movement of receptacle 110 between the collecting position and the opened position in any suitable fashion that enables object-sorting apparatus 100 to function as described herein.

In some embodiments, as noted above, receptacle 110 is configured for selective movement between the opened position and the emptying position. The emptying position is defined as receptacle 110 being in a position in which gravity causes any objects 200 in receptacle 110 to fall out of receptacle 110. For example, receptacle 110 in the emptying position is at least partially inverted relative to the collecting position, such that objects 200 supported by sorting base 104 (when receptacle 110 is in the collecting position) are caused by the force of gravity to fall out of receptacle 110 towards the ground. In some such embodiments, stage 102 includes a pivot mechanism 180 configured to guide movement of receptacle 110 between the opened position and the emptying position. For example, pivot mechanism 180 includes a base frame 182 affixed to inner members 174, and at least one piano hinge 184 coupled between base frame 182 and a side edge of sorting base 104. In the illustrated embodiment, base frame 182 is a rectangular frame configured to support a perimeter of sorting base 104 when receptacle 110 is in the collecting position and the opened position. Base frame 182 is sufficiently thin to provide an opening 186 that extends underneath all of apertures 106 when receptacle 110 is in the collecting position, such that base frame 182 does not obstruct objects 200 passing through apertures 106. Alternatively, base frame 182 has any suitable structure that enables stage 102 to function as described herein.

In the illustrated embodiment, the at least one piano hinge 184 includes two piano hinges 184. Alternatively, the at least one piano hinge 184 includes any suitable number of piano hinges 184 that enables stage 102 to function as described herein. Further in the illustrated embodiment, a first leaf (not visible) of the at least one piano hinge 184 is coupled to a top side of base frame 182 and a second leaf (not visible) is coupled to a bottom side of sorting base 104 along the side edge of sorting base 104. In other words, when receptacle 110 is in the collecting position and the opened position, the first and second leaves are in face-to-face relationship and the hinge knuckles (not numbered) are exterior to the adjacent retention wall 120. Accordingly, receptacle 110 is rotatable about the at least one piano hinge 184 between the opened position and the emptying position. Alternatively, stage 102 is configured to enable movement of receptacle 110 between the opened position and the emptying position in any suitable fashion that enables object-sorting apparatus 100 to function as described herein.

In some operational circumstances, drawer slide mechanism 170 and pivot mechanism 180 facilitate ease and repeatability of emptying collected objects 200 from receptacle 110. More specifically, drawer slide mechanism 170 and pivot mechanism 180 constrain movement of receptacle 110 to a repeatable emptying position relative to housing 108, such that a respective collection bin (not shown) may be repeatably placed in a same location 188, for example on the floor or ground, to receive objects 200 emptied from each stage 102. The same location 188 reduces a footprint needed for operation of object-sorting apparatus 100 as compared to conventional variable-width slot apparatuses, which require multiple collection bins to be simultaneously placed along an extended track. Additionally or alternatively, drawer slide mechanism 170 and pivot mechanism 180 improve an efficiency and reduce an amount of manual effort needed to empty receptacle 110 as compared to known sorting pan methods. More specifically, drawer slide mechanism 170 and pivot mechanism 180 provide stability to receptacle 110 and constrain movement of receptacle 110 to one degree of freedom during emptying, thus greatly reducing an amount of manual effort and time required to align, and maintain in position, receptacle 110 during emptying into the collection bin (not shown).

In some embodiments, receptacle 110 is configured to provide a grip for manual rotation of receptacle 110 from the opened position to the emptying position. For example, the retention wall 120 opposite the at least one piano hinge 184 may include a cutout 190 defined therein for gripping and pulling receptacle 110 upward and sideways away from base frame 182. Alternatively, receptacle 110 has any suitable configuration that enables object-sorting apparatus 100 to function as described herein.

Figure 10:
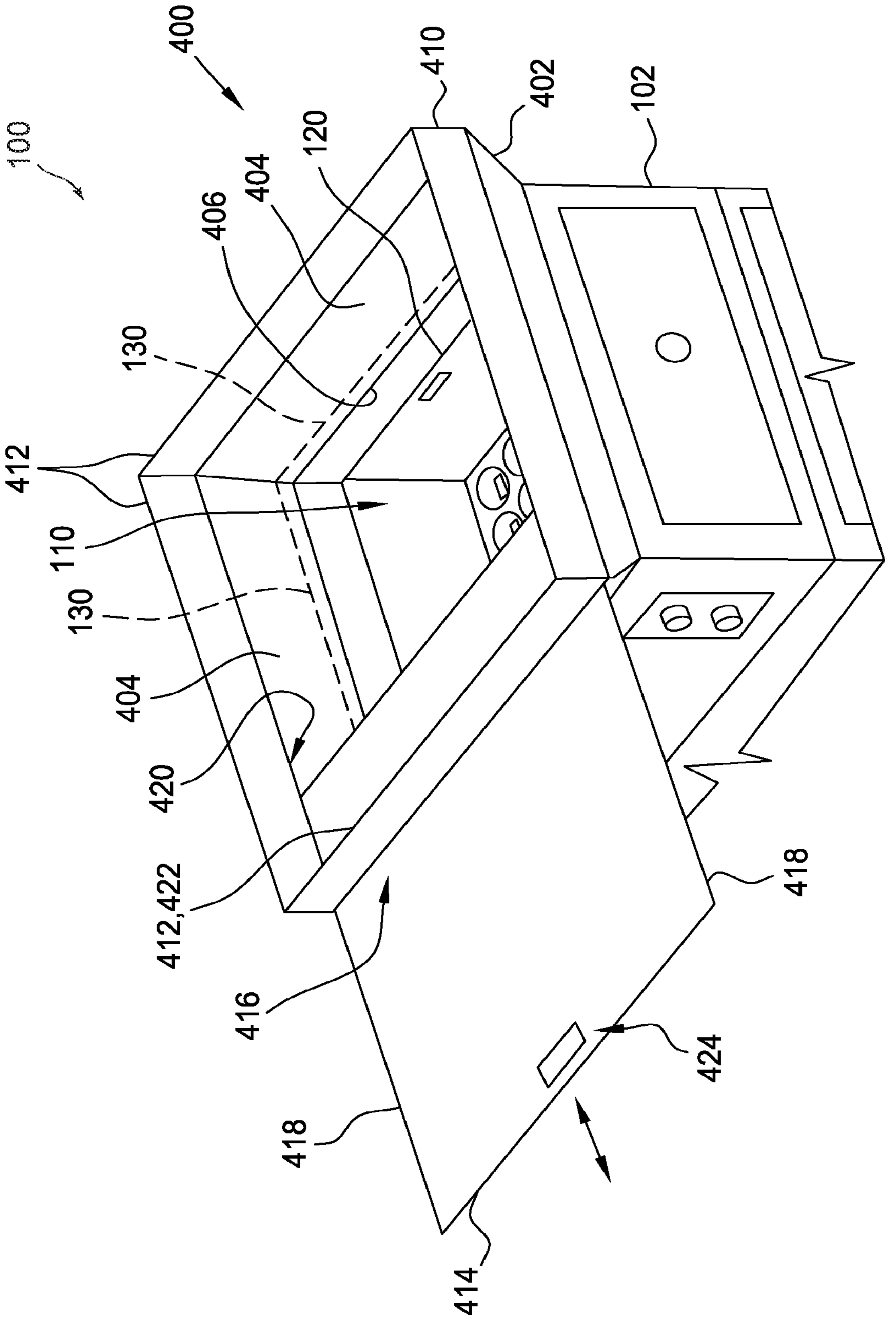
FIG. 10 is a perspective view of an example embodiment of an inlet system coupled to a top stage of the apparatus of FIG. 1.

FIG. 10 is a perspective view of an example embodiment of an inlet system 400 coupled to top stage 102 of object-sorting apparatus 100. In some embodiments, inlet system 400 includes a funnel 402 coupled to an upper portion of housing walls 130 of top stage 102. Funnel 402 is shaped and oriented to guide objects 200, such as a mix of objects 200 to be sorted, poured or released from above top stage 102 into receptacle 110 of top stage 102.

In the example embodiment, funnel 402 includes funnel walls 404 that extend upward from, and are inclined outward from, housing walls 130. Alternatively, funnel 402 has any suitable configuration that enables object-sorting apparatus 100 to function as described herein. For example, funnel walls 404 are illustrated as extending a relatively short distance outside a profile of top stage 102 for clarity of illustration, however, funnel walls 404 may extend taller and/or further beyond the profile of top stage 102 in some embodiments.

In the example embodiment, funnel walls 404 each include a lower lip 406 that extends inward beyond a top edge of the corresponding housing wall 130 and the adjacent retention wall 120. In certain embodiments, the extension of lower lip 406 facilitates preventing objects 200 poured into funnel 402 from becoming lodged in the interstices between retention walls 120 and housing walls 130. Alternatively, lower lip 406 does not extend inward beyond the top edge of the corresponding housing wall 130 and/or the adjacent retention wall 120

In some embodiments, inlet system 400 further includes a source tray 410 configured for positioning above top stage 102. Source tray 410 is configured to release the mix of objects 200 to be sorted into top stage 102, such as via funnel 402, or alternatively directly into top stage 102 in embodiments which do not include funnel 402. For example, source tray 410 may previously have been filled with the mix of objects 200 by an object-collecting apparatus (not shown).

In the example embodiment, source tray 410 includes tray walls 412 that extend vertically upward from a top portion of a corresponding one of funnel walls 404. Alternatively, tray walls 412 have any suitable configuration that enables inlet system 400 to function as described herein. Further in the example embodiment, a lower portion of tray walls 412 is sized and shaped to seat securely on a top portion of funnel walls 404 (or alternatively, on a top portion of top stage 102) to facilitate positioning of source tray 410 on, and removal of source tray 410 from, a position above top stage 102. Alternatively, source tray 410 is configured for positioning above top stage 102 in any suitable fashion that enables inlet system 400 to function as described herein.

In certain embodiments, source tray 410 includes a tray floor 414 that is bi-directionally slidable with respect to tray walls 412. More specifically, tray floor 414 is slidable between a first position, in which tray floor 414 blocks flow communication between source tray 410 and top stage 102, and a second position, in which a portion of tray floor 414 is outside a profile of tray walls 412, enabling flow communication between source tray 410 and top stage 102. In other words, moving tray floor 414 from the first position to the second position allows objects 200 within source tray 410 to fall through to top stage 102 to begin the automated sorting process.

In the example embodiment, source tray 410 includes a slotted opening 416 defined along a bottom of a first tray wall 422 of tray walls 412, and the portion of tray floor 414 moves through slotted opening 416 as tray floor 414 is moved between the first position and the second position. Alternatively, source tray 410 is configured to accommodate the bi-directional sliding movement of tray floor 414 in any suitable fashion that enables inlet system 400 to function as described herein.

In the example embodiment, tray floor 414 includes a cutout 424 defined therein for gripping and pulling tray floor 414 from the first position towards the second position, and tray floor 414 is sized such that cutout 424 is accessible outside first tray wall 422 when tray floor 414 is in the first position. Additionally or alternatively, inlet system 400 includes any other suitable features to facilitate movement of tray floor 414 between the first position and the second position.

In some embodiments, source tray 410 includes grooves 420 configured to slidably receive a pair of opposing edges 418 of tray floor 414 to enable sliding of tray floor 414 with respect to tray walls 412. For example, grooves 420 are defined along a bottom of each of a pair of tray walls 412 that are orthogonal to first tray wall 422. Alternatively, source tray 410 is configured to enable sliding of tray floor 414 with respect to tray walls 412 in any suitable fashion that enables inlet system 400 to function as described herein.

In some operational circumstances, tray floor 414 being slidably positionable with respect to tray walls 412 facilitates reducing a manual effort required for, and/or pouring errors associated with, introducing the mix of objects 200 into funnel 402 or, alternatively, directly into top stage 102. More specifically, source tray 410 filled with the mix of objects 200 may simply be seated atop funnel 402 or, alternatively, directly atop top stage 102, and after source tray 410 is seated, tray floor 414 may be moved from the first position to the second position to quickly and accurately release objects 200 towards top stage 102 under the force of gravity. Thus, for example, source tray 410 avoids manual effort and spills associated with tipping and/or holding in position a bucket of objects 200 during pouring into a conventional object sorting apparatus.

Examples of an automated object-sorting apparatus are described above in detail. The apparatus is not limited to the specific examples described herein, but rather, components of the apparatus may be used independently and separately from other components and environmental elements described herein. For example, the apparatus described herein may be used to sort any category of objects having a suitable range of sizes for sorting s described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An object-sorting apparatus comprising:

a housing that extends from a top end to a bottom end;

upper and lower receptacles arranged in a vertical sequence in the housing between the top end and the bottom end, wherein the upper receptacle is selectively translatable, along a translation direction, between a collecting position inside the housing and an opened position, and is selectively rotatable, about an axis parallel to the translation direction, between the opened position and an emptying position, and wherein the upper receptacle comprises a floor comprising a plurality of apertures defined therein and extending therethrough, the plurality of apertures in flow communication with the lower receptacle when the upper receptacle is in the collecting position;

at least one vibration element operationally coupled to the floor when the receptacle is in the collecting position;

a drawer slide mechanism coupling the upper receptacle to the housing, the drawer slide mechanism configured to guide movement of the upper receptacle between the collecting position and the opened position; and a pivot mechanism coupled between the drawer slide mechanism and the upper receptacle, the pivot mechanism configured to guide movement of the upper receptacle between the opened position and the emptying position.

2. The object-sorting apparatus according to claim 1, wherein the drawer slide mechanism includes a sliding member affixed to the upper receptacle, and the pivot mechanism is coupled to the sliding member.

3. The object-sorting apparatus according to claim 2, wherein the pivot mechanism comprises a hinge, wherein a first leaf of the hinge is affixed to the sliding member and a second leaf of the hinge is affixed to the upper receptacle.

4. The object-sorting apparatus according to claim 3, wherein the sliding member is one of a pair of sliding members affixed to the upper receptacle on opposite sides of the upper receptacle.

5. The object-sorting apparatus according to claim 1, wherein the upper receptacle is configured to provide a manual grip for manual rotation of the upper receptacle from the opened position to the emptying position.

6. The object-sorting apparatus according to claim 1, wherein the lower receptacle is selectively translatable, along the translation direction, between a lower-stage collecting position inside the housing and a lower-stage opened position, and is selectively rotatable, about a lower-stage axis parallel to the translation direction, between the lower-stage opened position and a lower-stage emptying position.

7. The object-sorting apparatus according to claim 6, wherein the upper receptacle in the emptying position is positioned directly over a ground area outside a footprint of the housing, and the lower receptacle in the lower-stage emptying position is positioned directly over the ground area corresponding to the upper receptacle in the emptying position.

8. The object-sorting apparatus according to claim 6, further comprising a lower-stage pivot mechanism configured to guide movement of the lower receptacle between the lower-stage opened position and the lower-stage emptying position.

9. An object-sorting apparatus comprising:

at least one vibration element; and a plurality of modular stages stacked in a vertical sequence, wherein each of the plurality of modular stages comprises:

housing walls configured to align vertically with the housing walls of at least one vertically adjacent stage of the plurality of stages, wherein the housing walls of the plurality of stages cooperate to define a housing of the object-sorting apparatus;

a receptacle configured for selective movement between a collecting position inside the housing and an opened position, the receptacle comprising receptacle walls and a floor, the floor comprising a plurality of apertures defined therein and extending therethrough, the floor operationally coupled to the at least one vibration element when the receptacle is in the collecting position, wherein a first of the plurality of stages further comprises a tab along one of an upper edge and a lower edge of the housing walls and a second of the plurality of stages further comprises a slot along an opposite one of the upper edge and the lower edge, the tab and the slot configured to register when the first and second stages are vertically stacked together.

10. The object-sorting apparatus according to claim 9, wherein the receptacle is further selectively movable between the opened position and an emptying position.

11. The object-sorting apparatus according to claim 10, further comprising a pivot mechanism configured to guide movement of the receptacle between the opened position and the emptying position.

12. The object-sorting apparatus according to claim 11, wherein the receptacle is configured for translation between the collecting position and the opened position, and wherein the pivot mechanism is configured for rotation of the receptacle about an axis parallel to a direction of the translation.

13. The object-sorting apparatus according to claim 11, wherein each stage further comprises a drawer slide mechanism coupling the receptacle to the housing walls, the drawer slide mechanism configured to guide movement of the receptacle between the collecting position and the opened position.

14. The object-sorting apparatus according to claim 13, wherein the pivot mechanism is coupled between the drawer slide mechanism and the receptacle.

15. The object-sorting apparatus according to claim 14, wherein the drawer slide mechanism includes a sliding member affixed to the receptacle, and the pivot mechanism is coupled to the sliding member.

16. The object-sorting apparatus according to claim 15, wherein the pivot mechanism comprises a hinge, wherein a first leaf of the hinge is affixed to the sliding member and a second leaf of the hinge is affixed to the receptacle.

17. The object-sorting apparatus according to claim 9, wherein the receptacle of each stage in the emptying position is positioned directly over a common ground area outside a footprint of the housing.

18. An object-sorting apparatus comprising:

at least one vibration element; and a plurality of modular stages stacked in a vertical sequence and in vibratory communication with the at least one vibration element, wherein each of the modular stages comprises housing walls and a stage floor, the housing walls configured to align vertically with the housing walls of at least one vertically adjacent modular stage, wherein the stage floor of at least one of the modular stages comprises a plurality of apertures defined therein and extending therethrough into flow communication with a next lower one of the modular stages; and a source tray positioned above a top one of the modular stages, the source tray comprising a tray floor that is bi-directionally slidable with respect to the modular stages between a first position, in which the tray floor blocks flow communication between the source tray and the top stage, and a second position that enables flow communication between the source tray and the top stage.

19. The object-sorting apparatus according to claim 18, wherein the at least one of the modular stages further comprises:

a receptacle comprising the stage floor;

a drawer slide mechanism coupling the receptacle to the housing walls, the drawer slide mechanism configured to guide movement of the receptacle between a collecting position and an opened position; and a pivot mechanism coupled between the drawer slide mechanism and the receptacle, the pivot mechanism configured to guide movement of upper receptacle between the opened position and an emptying position.

20. The object-sorting apparatus according to claim 18, wherein a first of the modular stages further comprises a tab along one of an upper edge and a lower edge of the housing walls and a second of the modular stages further comprises a slot along an opposite one of the upper edge and the lower edge, the tab and the slot configured to register when the first and second modular stages are vertically stacked together.

* * * * *